J. E. BALL.
SIGNAL.
APPLICATION FILED JULY 3, 1920.

1,373,936.

Patented Apr. 5, 1921.
2 SHEETS—SHEET 1.

WITNESSES:
F. L. Fox.

John E. Ball.
INVENTOR
BY Victor J. Evans.
ATTORNEY

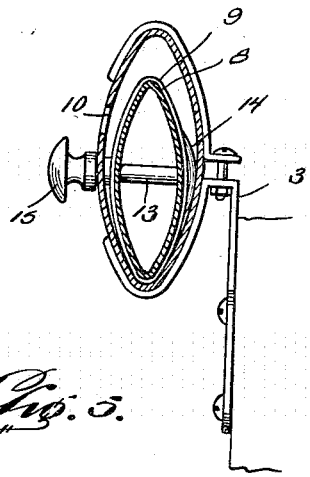
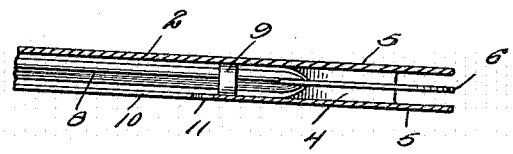
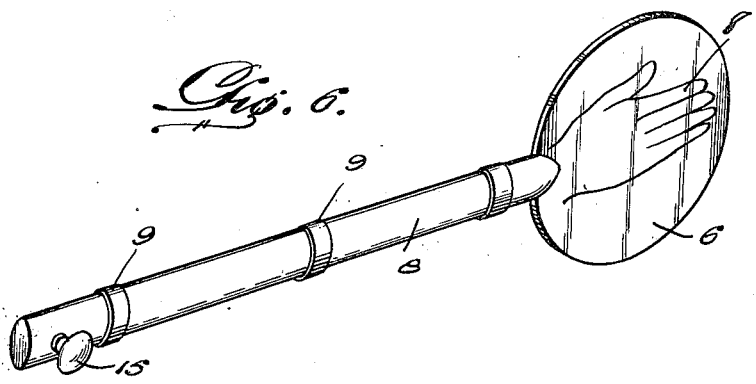
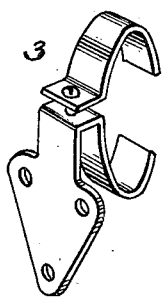

UNITED STATES PATENT OFFICE.

JOHN E. BALL, OF COUNCIL BLUFFS, IOWA.

SIGNAL.

1,373,936.

Specification of Letters Patent.

Patented Apr. 5, 1921.

Application filed July 3, 1920. Serial No. 393,821.

*To all whom it may concern:*

Be it known that I, JOHN E. BALL, a citizen of the United States, residing at Council Bluffs, in the county of Pottawattamie and State of Iowa, have invented new and useful Improvements in Signals, of which the following is a specification.

The present invention has reference to a hand controlled directing indicating apparatus for vehicles.

The primary object is the production of a simple, cheap and thoroughly efficient apparatus of this class which may be operated quickly and conveniently by the driver of the vehicle to indicate the direction in which he is about to steer the vehicle.

A further object is the production of a direction indicating apparatus for vehicles, in which the signal is normally received in a casing and manually operated to bring the same into or out of the casing, means being provided for locking the signal in either position, and means being also provided for reducing the friction between the signal and casing during the sliding movement of the former through the latter.

The foregoing, and other objects which will appear as the nature of the invention is better understood, may be accomplished by a construction, combination and operative arrangement of parts, such as is disclosed by the drawings.

In the drawings:—

Fig. 4 is a similar view on the line 4—4 of Fig. 1.

Fig. 5 is a similar view on the line 5—5 of Fig. 1.

Fig. 6 is a perspective view of one of the signaling arms.

Fig. 7 is a similar view of one of the clamps which may be employed for retaining the device on the vehicle.

Figure 1:
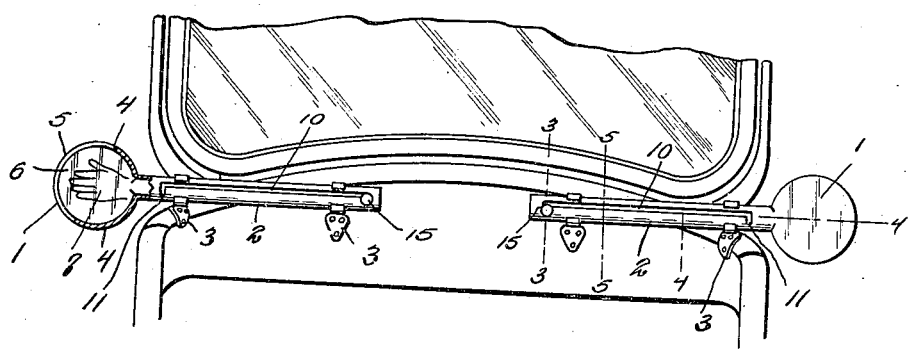
Figure 1 is a view in elevation looking toward the windshield of a vehicle, and illustrating the application of the improvement.
Figure 2:
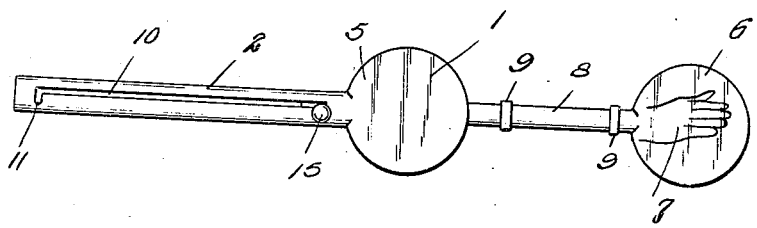
Fig. 2 is an elevation showing the signal in signaling position.
Figure 3:
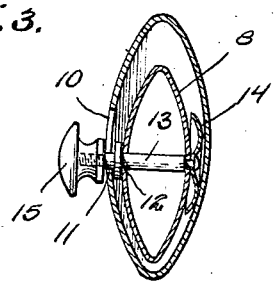
Fig. 3 is a cross view on the line 3—3 of Fig. 1.

While in the drawings I have illustrated the improvement attached to the dash of a vehicle, approximately in a line with the lower edge of the windshield thereof, it is to be understood that the same may be attached to any other desired part of a vehicle, and in the event of the improvement being employed on a closed vehicle, small openings may be made in the sides thereof through which the casings or housings for the indicators pass.

As disclosed by the drawings two indicators are employed which are arranged in parallelism, but, as the details of construction of both of the indicators are similar, particular reference will be made to only one of the same, while the reference characters indicating the different parts are to be considered applicable to both of the devices.

On the sides of the body of the vehicle are the head portions or members 1 of housings 2. The housings are in the nature of cross sectionally elliptical casings so that no sharp corners or edges are provided in the construction thereof. The housings are secured by clips or brackets 3 to the front of the automobile, and the head portions 1 of the said housings are retained in spaced relation to each other by inwardly flared flanges 4 that connect the side members 5 of the said housing. It is to be noted that the members 4 terminate a suitable distance away from the outer ends of the heads 2, and if desired the lower member 4 may be of a greater length than the upper member 4. This may be found desirable, inasmuch as the lower member 4 supports the disk 6 on both faces of which a hand or other signaling device is located, as indicated by the numeral 7.

Each of the signal disks 6 is provided with an arm 8 that is elliptical in cross section, and that, of course, has its sides flared to the sides of the disk. The arm is of a less cross sectional diameter than the housing 2 in which it is received, and preferably the arm 8 is hollow. On the arm 8, at desired spaced intervals there are arranged continuous anti-frictional bands 9 that contact with the inner walls of the housings 2.

Each of the housings has on its inner face an elongated slot 10 provided, adjacent to the ends thereof with downwardly extending passages 11.

Each of the arms 8 has at its inner end a transverse opening 12. Passing through the opening is a lug 13. On the inner face of the lug is a compressible spring member 14. On the outer face of the lug there is a handle 15 that is also arranged on the outer face of the housing 2. The handle is designed to be moved from either of the slots or passages 11 into the main slot 10, which has to move the arm 8 either inwardly or outwardly of the housing to bring the signal disk 6 to either signaling or non-signaling position. When in signaling position the handle is moved to bring the lug 13 in the passage 11 near the outer end of the slot 10. The spring element 14 engaging with the lug exerts a tension against the inner face of the handle and the lug, thus holding the handle against the wall of the housing that surrounds the outer passage 11. In a like manner a spring tension is exerted between the handle and the wall of the housing that surrounds the inner passage 11, so that the device may be effectively locked in either signaling or non-signaling position. The anti-frictional bands that surround the arms 8 permit of the free sliding of the arms through the housing, and it is thought that the foregoing description, when taken in connection with the drawings, will fully set forth the simplicity and advantages of the construction to those skilled in the art to which such inventions relate, without further detailed description.

Having thus described the invention, what I claim, is:—

A direction indicating apparatus for vehicles, including an elongated housing elliptical in cross section having a round head at the end thereof providing two spaced members, and flanges connecting the upper and lower edges thereof to the housing and the lower flange being of a greater length than the upper flange, a signal including a disk that is normally received in the housing and rests on the lower flange thereof, an elongated arm elliptical in cross section extending from the disk into the housing, anti-frictional bands on the arms, said housing having elongated slots and passages communicating therewith adjacent the ends thereof, a lug passing through the arm and entering the slot, spring means on the lug contacting with the inner ends of the arm for moving the lug inward of the housing, a handle member on the outer end of the lug and received thereby into contacting engagement with the outer face of the housing, and said handle designed to cause the lug to be passed through the slot to enter either of the passages thereof when the same is manually operated to bring the disk to signaling or non-signaling position.

In testimony whereof I affix my signature.

JOHN E. BALL.